(12) United States Patent
Hars (10) Patent No.: US 7,848,518 B2
(45) Date of Patent: Dec. 7, 2010

(54) STABLE DISC CONTROLLER ID FROM UNSTABLE COMPARATOR OUTPUTS

(75) Inventor: Laszlo Hars, Cranberry Township, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 1515 days.

(21) Appl. No.: 10/879,969

(22) Filed: Jun. 29, 2004

(65) Prior Publication Data
US 2005/0286351 A1    Dec. 29, 2005

(51) Int. Cl.
*H04L 9/00* (2006.01)
*H04L 9/34* (2006.01)

(52) U.S. Cl. ............... 380/44; 380/43; 380/47; 380/228; 369/30.58

(58) Field of Classification Search .......... 380/47
See application file for complete search history.

(56) References Cited

U.S. PATENT DOCUMENTS

| | | | | |
|---|---|---|---|---|
| 5,881,152 | A | 3/1999 | Moos | 380/4 |
| 5,960,086 | A * | 9/1999 | Atalla | 380/44 |
| 6,079,619 | A | 6/2000 | Teraura et al. | 235/380 |
| 6,246,767 | B1 * | 6/2001 | Akins et al. | 380/210 |
| 6,266,754 | B1 * | 7/2001 | Laczko et al. | 711/203 |
| 6,400,824 | B1 | 6/2002 | Mansoorian et al. | 380/269 |
| 6,539,410 | B1 * | 3/2003 | Klass | 708/255 |
| 6,580,906 | B2 * | 6/2003 | Bilgic et al. | 455/422.1 |
| 6,704,871 | B1 * | 3/2004 | Kaplan et al. | 713/192 |
| 6,735,693 | B1 * | 5/2004 | Hamlin | 713/168 |
| 6,738,788 | B1 | 5/2004 | Horng et al. | 707/104.1 |
| 7,131,004 | B1 * | 10/2006 | Lyle | 713/169 |
| 7,191,339 | B1 * | 3/2007 | Trimberger | 713/185 |
| 7,325,746 | B2 * | 2/2008 | Nishizawa et al. | 235/492 |
| 2003/0185124 | A1 | 10/2003 | Hattori et al. | 369/53.17 |
| 2003/0204743 | A1 * | 10/2003 | Devadas et al. | 713/200 |
| 2004/0005052 | A1 * | 1/2004 | Maeda | 380/28 |
| 2004/0153642 | A1 | 8/2004 | Plotkin et al. | 713/150 |
| 2004/0205348 | A1 | 10/2004 | Watanabe et al. | 713/182 |

OTHER PUBLICATIONS

Jiang, Tianpu. Hou, Yongmin. Zheng, Shibao. "Secure Communication Between Set-Top Box and Smart Card in DTV Broadcasting". IEE Transactions on Consumer Electronics. Pub. Date: Aug. 2004. Relevant pp. 882-886. Found on the World Wide Web at: http://ieeexplore.ieee.org/stamp/stamp.jsp?tp=&arnumber=1341695.*

(Continued)

*Primary Examiner*—William R Korzuch
*Assistant Examiner*—Jeremiah Avery
(74) *Attorney, Agent, or Firm*—Theodore M. Magee; Westman, Champlin & Kelly, P.A.

(57) ABSTRACT

A method for generating a root key is described. Stable bits of a plurality of comparator outputs are identified. The root key is selected from a number of the identified stable bits. A statistically unique value is calculated from the root key using a cryptographically secure function. An identifier of the identified stable bits and the statistically unique value are stored in a memory.

24 Claims, 6 Drawing Sheets

OTHER PUBLICATIONS

Shigenobu Maeda et al. "An Artificial Finger Device (AFD): A Study of Identification Number Applications Utilizing Characteristics Variation of Polycrystalline Silicon TFTs," IEEE Transactions on Electron Devices, vol. 50, No. 6, Jun. 2003, pp. 1451-1458.

Tian Ze et al. "A Research on System-Level Architecture of Single-Chip Cryptographic Data," IEEE Transactions, 2002, pp. 1486-1490.

F. Burke et al. "Optimizing Dynamic-Threshold DTMOS Device Performance in an SOI Embedded DRAM Technology," IEEE Transactions, 2003, pp. 292-294.

Chaves, R. and Sousa, L.; "RDSP: A RISC DSP Based on Residue Number System," IEEE Proceedings on the Euromicro Symposium on Digital System Design, 2003, pp. 1-8.

Cheng, Ming-C. and Yu, F.; "Heat Flow Models for Silicon-On-Insulator Structures," IEEE Transactions 2003, pp. 244-249.

Cindy Williams. "Intel's Pentium Chip Crisis: An Ethical Analysis," IEEE Transactions on Professional Communication, vol. 40, No. 1, Mar. 1997, pp. 13-19.

Hasnain, Z. and Ditali, A.; "Building-In Reliability: Soft Errors-A Case Study," IEEE Transactions, 1992, pp. 276-280.

Schuegraf, K. and Hu, C.; "Effects of Temperature and Defects on Breakdown Lifetime on Thin $SiO_2$ at Very Low Voltages," IEEE Transactions on Electron Devices, vol. 41, No. 7, Jul. 1994, pp. 1227-1232.

Carlos P. Coelho et al. "A Convex Programming Approach for Generating Guaranteed Passive Approximations to Tabulated Frequency-Data," IEEE Transactions on Computer-Aided Design of Integrated Circuits and Systems, vol. 23, No. 2, Feb. 2004, pp. 293-301.

M.A. Imam et al. "Modelling the Threshold Voltage of Short-Channel Silicon-On-Insulator Mosfets," *Electronics Letters* Mar. 1993, vol. 29, No. 5, pp. 474-475.

Syed Sajid Ahmad et al. "A Method for the Measurement of Chip to Leadframe Adhesion in LOC Packages," IEEE/CPMT Int'l Electronics Manufacturing Technology Symposium, 1996, pp. 402-407.

Ditali, A. and Black, W.; "Failure Distributions and Area Transformation of thing $SiO_2$ films," *Electronics Letters*, Mar. 1994, vol. 30, No. 6, pp. 487-488.

Mensour, B. and Longtin, A.; "Controlling Chaos to Store Information in Time-Delayed Feedback Systems," IEEE Transactions, 1997, pp. 1487-1488.

Kazushige Ayukawa et al. "An Access-Sequence Control Scheme to Enhance Random-Access Performance Performance of Embedded DRAM's," IEEE Journal of Solid-State Circuits, vol. 33, No. 5, May 1998, pp. 800-806.

Feng Lin et al. "A Register-Controlled Symmetrical DLL for Double-Data-Rate DRAM," IEEE Journal of Solid-State Circuits, vol. 34, No. 4, Apr. 1999, pp. 565-568.

R. AbdelRassoul. "PC-1A Analysis of Anomalous Current-Voltage Characteristics of Silicon Solar Cells," 16th National Radio Science Conference, NRSC '99, pp. 1-8.

R. AbdelRassoul. "PC-1A Analysis of Anomalous Current-Voltage Characteristics of Silicon Solar Cells," Dec. 1998, pp. 45-52.

Yamashita, Y. and Jiang, T.; "Flux-Underfill Compatibility Study for Flip-Chip Manufacturing," 2001 International Symposium on Advanced Packaging Materials, pp. 37-41.

R.P.S. Thakur et al. "Process Simplification in DRAM Manufacturing," IEEE Transactions on Electron Devices, vol. 45, No. 3, Mar. 1998, pp. 609-619.

Banerjee, P. and Ditali, A.; "Uniqueness in Activation Energy and Charge-to-Breakdown of Highly Asymmetrical DRAM $Al_2O_3$ Cell Capacitors," IEEE Transactions Electron Device Letters, vol. 25, No. 8, Aug. 2004, pp. 574-576.

\* cited by examiner

STABLE DISC CONTROLLER ID FROM UNSTABLE COMPARATOR OUTPUTS

FIELD OF THE INVENTION

The present invention relates to a system and method for producing a silicon ID based on physical properties of an integrated circuit, and, more particularly, for dynamically producing a reliable identifier from a plurality of stochastically unstable bits of the silicon ID.

BACKGROUND OF THE INVENTION

Privacy or security of information is desirable in many applications. Data encryption techniques have been developed to increase the security or privacy of information (including text, images, data streams, and the like) by encoding the information to limit unauthorized access. Many such encryption techniques utilize a "key" based on a particular algorithm to change the sequence or format of the information ("plaintext") so that the information is enciphered or "scrambled" into an unintelligible form ("ciphertext"). The information may be recovered using a "key" that is constructed based on the encryption method. However, an unauthorized user, who does not have the knowledge of either the encryption algorithm (or method) or the "key", cannot easily decode the information.

In general, cryptosystems are devices that are adapted to encrypt information. Cryptosystems can be symmetrical systems (symmetric key systems) or asymmetrical systems (public-private key systems). Symmetrical systems are typically based on functions that can be easily computed but for which the inverse functions are extremely difficult to compute. Asymmetrical systems typically utilize a secret key which is not shared by the communicating devices, such that an eavesdropper must guess this secret key among numerous possibilities in order to gain access to the ciphertext. Symmetrical and asymmetrical encryption techniques may be applied to data stored in storage devices, to data transmitted over a communication channel, or to any other device or in any circumstance where it is desirable to secure information from unauthorized access. No matter which technique is used, protection of the secret or private key is vital to maintaining the integrity of the data security.

In a storage device that offers hardened security features, a root key may be used by the device to encrypt information as a symmetric key or to derive public/private key pairs. The term "root key" refers to a primary secret or private key of a cryptographic subsystem. As used herein, the term "cryptographic" pertains to various means and methods of rendering plain text unintelligible and of reconverting cipher text into an intelligible form. A cryptographic subsystem is one which uses cryptographic techniques to render information unintelligible in its stored form, and which may also reconvert the encrypted (cipher) text back into an intelligible form in response to a request by an authorized entity or user. Generally, the root key serves as the encryption key for the storage of all other keys, and discovery of the root key typically constitutes a root breach of the integrity of the subsystem. Thus, it is important to maintain the root key as a secret.

The root key may be provided to the storage device via a number of techniques including programming the key at the factory, deriving the key from a random number generator, or providing a means for the user to program the key at drive installation. If the root key is programmed in the factory, it is conceivable that an insider could steal the keys and attack the corresponding drives after they are sold. If a random number generator is used, the generator must generate truly random numbers rather than easily recoverable random-looking numbers. If the user programs the key, the system may need to include additional complexity (such as requiring the user to insert a patch cable or wire to connect adjacent exposed pins on a printed circuit board that control the functionality of the card) and may be inconvenient for the user.

Many technologies have been investigated to provide root key memory storage. These technologies include flash, EEPROM, MR RAM (MRAM), Ferro RAM (FRAM), fuses and anti-fuses, and the like. Such systems have various limitations including size and cost. Moreover, such systems require that the key value be "programmed" into memory, meaning that the root key is programmed. All of these technologies are suitable for realizing the root key as described above.

The Chip ID or silicon ID is a chip-identifying technology that has been used by various application-specific integrated-circuit (ASIC) suppliers and companies. The silicon ID is typically hundreds of bits long, and is not programmed, but rather it is created when the chip is created and recreated (or re-established) each time the chip is powered. The silicon ID itself is a function of the natural randomness of the threshold voltage ($V_t$) in a silicon transistor or some similar hardware technique. Each ID bit is created by a transistor pair with a comparator to compare the output of each transistor. In general, a comparator is a name given to an electronic component or arithmetic circuit for comparing the relative sizes of two binary numbers. The comparator is configured to make a comparison to determine whether a signal voltage is higher or lower than a certain reference level, which is indicative of a line of demarcation between a logical "1" or a logical "0". Thus, a comparator receives two or more inputs, compares the two inputs, and produces a single output representative of the two inputs. In the present invention, the comparator may be any logical or arithmetic circuit adapted to produce a single output from two or more inputs. Depending on the natural randomness in the threshold voltage ($V_t$) of each transistor, each comparator will read either a "0" or a "1" value. A plurality of comparator output voltages forms a physical silicon ID.

Due to the random nature of the threshold voltage, some transistor pairs will probabilistically have very similar threshold voltage values. The silicon ID produced however is statistically unique, meaning that it can be determined with relatively high probability which ID measured in the field corresponds to an ID recorded in the factory. Silicon ID technology has been used primary by ASIC suppliers and ASIC consumers as an inexpensive way to achieve an ASIC-tracking ID without adding expensive memory technology. Typically, this ASIC-tracking ID is used with wafer lot and other process information for debug analysis.

There is a need in the storage industry for hardened security features, and more particularly, for hardened security features that cannot readily be bypassed by a determined hacker. Furthermore, there is a need in the storage industry for a technique of creating an encryption key for use in encryption algorithms built into the storage subsystem, wherein the encryption key cannot be reverse engineered or detected by eavesdropping or hacking the controller circuit. Embodiments of the present invention provide solutions to these and other problems, and offer other advantages over the prior art.

SUMMARY OF THE INVENTION

A method for generating a root key is described. Stable bits of a plurality of comparator outputs are identified. The root key is selected from a number of the identified stable bits. A statistically unique value is calculated from the root key with a cryptographically secure function. An identifier of the identified stable bits and the statistically unique value are stored in a memory.

A method of restoring a root key is also described. A string of comparator bits corresponding to stable bits of the plurality of comparator outputs is retrieved. A value is calculated based on the string of comparator bits. The value is compared against a stored value. If the value and the stored value are different, changed values are identified in the string of comparator bits. In one embodiment, the root key is restored by iteratively testing possible selections of bits of the string until a match is found between the calculated value and the stored value.

In one embodiment, a storage device includes a storage media and an integrated circuit with a controller. The integrated circuit has a plurality of pairs of transistors. Each pair of transistors is associated with a comparator to produce a comparator output. The plurality of pairs of transistors and associated comparators cooperate to form a plurality of comparator outputs. The controller is coupled to the integrated circuit and disposed within the storage device for controlling access to data stored on the storage media. The controller is adapted to measure the plurality of comparator outputs and to form a root key from a number of stable bits associated with the plurality of comparator outputs according to an identifier of stable bits stored on the storage media.

In another embodiment, a storage device includes a storage media and a controller. The controller is coupled to the storage media and is disposed within the storage device. The controller includes a comparator circuit block and a cryptographic circuit block. The comparator circuit block is adapted to produce a string of bits representative of a silicon ID. The cryptographic circuit block is adapted to encrypt information using a portion of the string.

DETAILED DESCRIPTION OF ILLUSTRATIVE EMBODIMENTS

Figure 1:
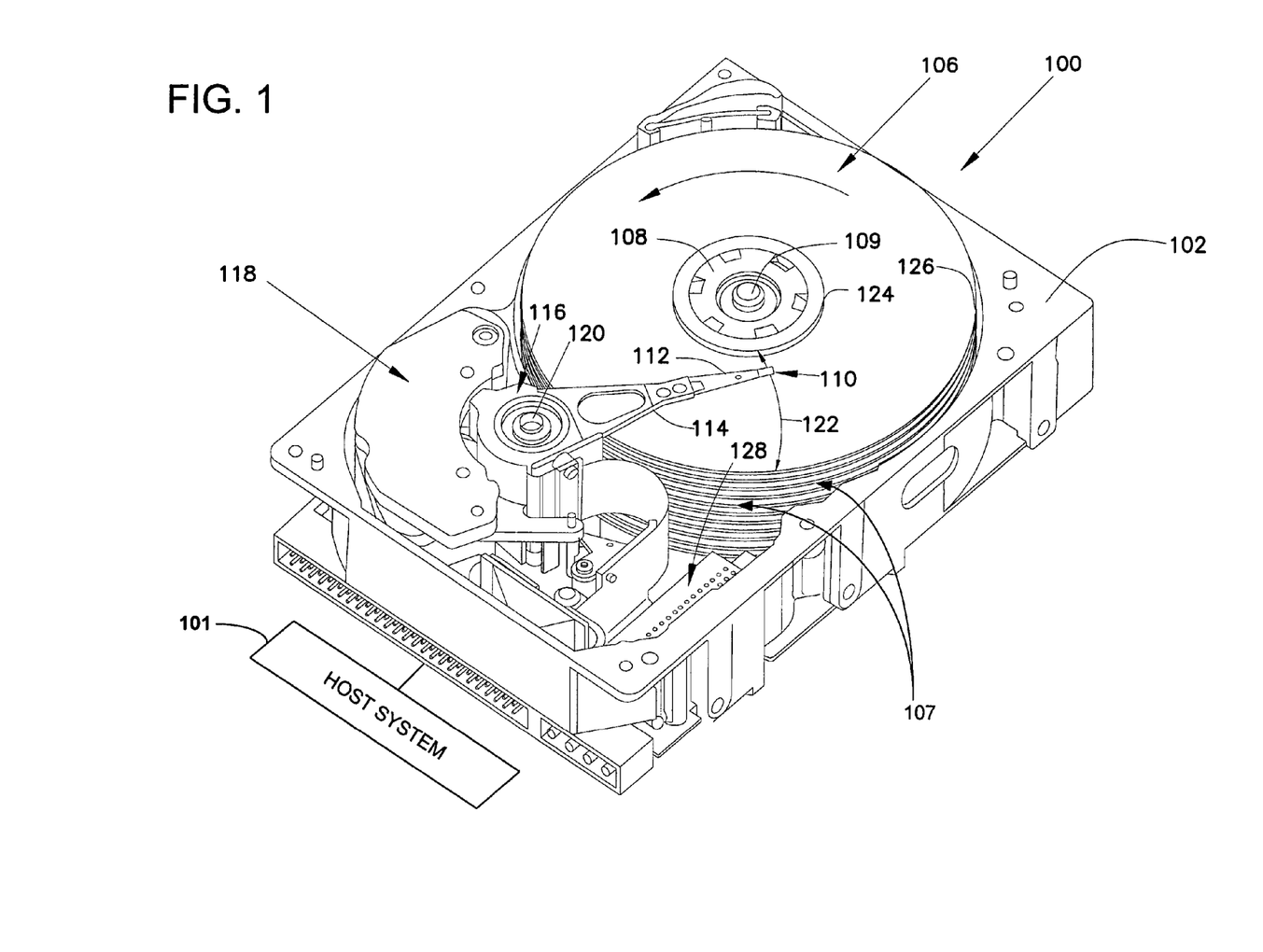
FIG. 1 is an isometric view of a disc drive.

FIG. 1 is a perspective view of a disc drive 100 in which the present invention may be used. Disc drive 100 can be configured as a traditional magnetic disc drive, a magneto-optical disc drive or an optical disc drive, for example. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs 107, which are mounted for co-rotation about central axis 109. Each disc surface has an associated slider 110, which is mounted to disc drive 100 and carries a read/write head for communication with the disc surface.

In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached sliders 110 about a pivot shaft 120 to position sliders 110 over a desired data track along a path 122 between a disc inner diameter 124 and a disc outer diameter 126. Voice coil motor 118 operates under control of internal circuitry 128. Other types of actuators can also be used, such as linear actuators.

In general, a host system 101 interacts with the disc drive 100 via the internal circuitry 128 of the disc drive 100. The circuitry 128 and associated firmware controls access to the storage media 107 and is sometimes referred to as a "controller" or a "controller interface".

It will be understood by a worker skilled in the art that the embodiment of a storage device shown in FIG. 1 is one type of storage subsystem on which the present invention may be implemented. However, the present invention is equally applicable to flash memory, EEPROM, MRAM, and/or any other type of storage subsystem for which cryptography is desired.

In general, a physical silicon ID or chip ID based on a plurality of comparator outputs has been used by integrated circuit manufacturers to identify chips. The physical silicon ID is based on relatively unchanging physical properties of the individual transistor pairs such as the gate oxide capacitance per unit area, the work function differences between the gate metal and the silicon, the positive charge density in the oxide at the silicon interface, the Fermi level, and the like. However, such physical properties may produce different comparator outputs at different times. In other words, the threshold voltage values as determined by individual comparators may vary, meaning that some of the physical silicon ID bits can change over time.

Because some of the individual bits of the silicon ID can change over time, conventionally the silicon ID could not be utilized effectively as an encryption key. If the silicon ID were used as a key for encryption/decryption and if some of the silicon ID bits changed, the encryption/decryption key would be lost and data would become inaccessible. The present invention is a system and method for utilizing stable bits of the chip ID to produce a stable bit string for use as a root key, thereby establishing a fixed relationship between data stored on the disc and the controller circuit of the storage subsystem. This fixed relationship ensures that security measures embedded in the controller circuit are adhered to and cannot be bypassed by using a hacked controller circuit to replace the controller circuit of the device.

It will be understood by workers skilled in the art that a unique and statistically random chip ID can be derived from the outputs of a series of comparators on an ASIC. For example, as an added feature, a couple of hundred comparators are implemented on some ASICs (256-bit data field, 32-bits reserved for process, batch and chip variant information). Both inputs of each comparator are electrically coupled to the same supply voltage, and physical variations in the comparator structures leads to an effectively random output. Such physical variations include manufacturing process variation, random substrate structure, changing environmental conditions, and the like. The effectively random output can thus form a 224-bit random physical silicon ID number (FID). The chip ID can be based on the FID, because the value of the FID is effectively uniform random (a good, statistically random number). However, over time, variations in temperature and supply voltage may cause some of the bits to flip. Preliminary data indicates that as many as 17 bits may be uncertain or unstable.

In general, the present invention makes use of the FID to derive a chip ID, which can be formed from a predetermined number of the bits that make up the FID. To have a reliable chip ID (CID), the FID should be constant over time and in response to changing environments. Since the FID may vary, it is necessary to provide a mechanism for recovering selected bits of the FID from which the CID is derived. However, any correction mechanism must avoid disclosing information about the root key to a potential eavesdropper. In the present invention, correction circuits are not required, and no information about the CID is exposed to an eavesdropper of the disc data. Thus, the CID can be utilized as a cryptographic key.

Figure 2:
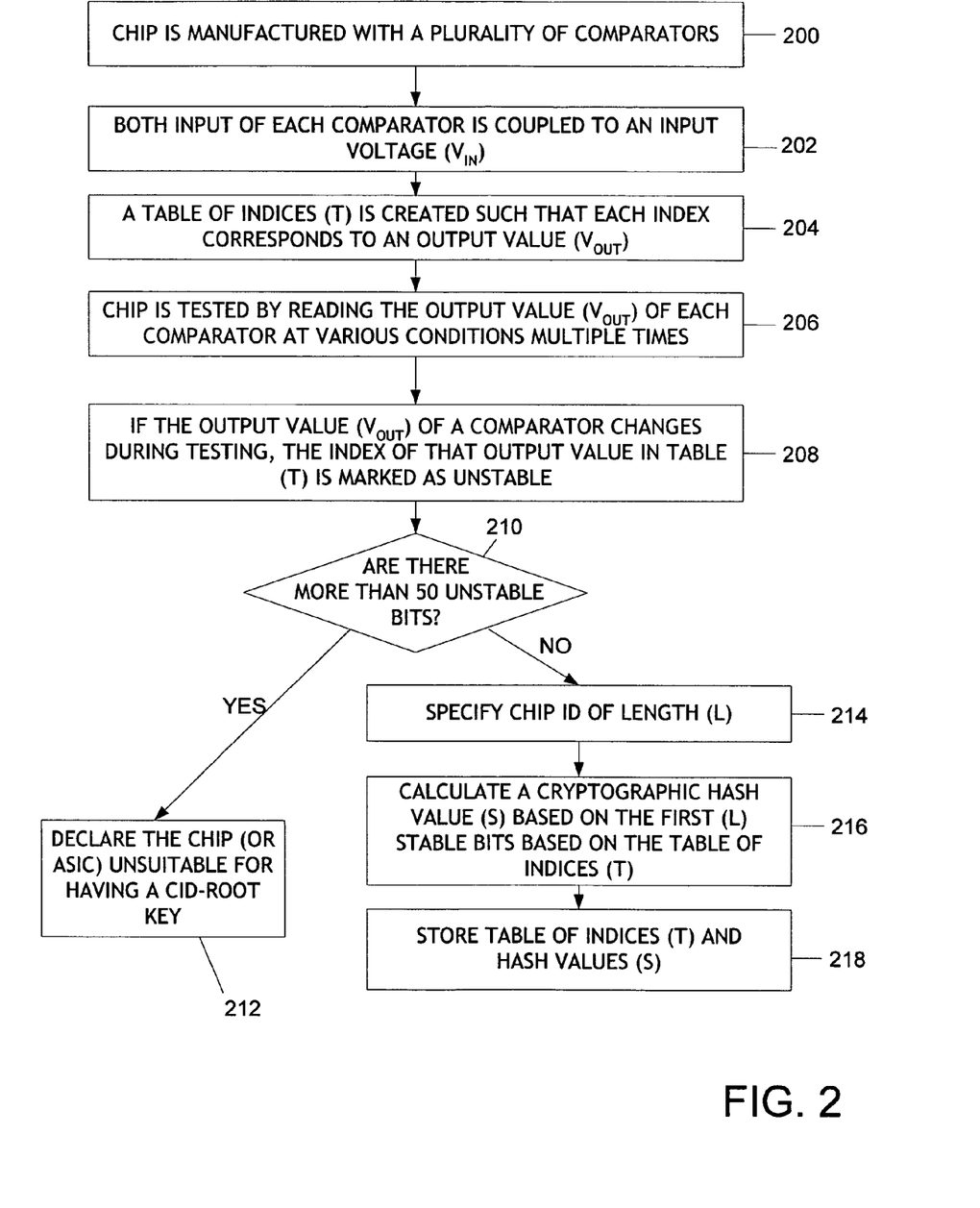
FIG. 2 is a simplified flow diagram of a method of producing a table of indices of stable ones according to an embodiment of the present invention.

FIG. 2 illustrates a simplified flow diagram of the process of creating a CID according to an embodiment of the present invention. First, a chip (or an ASIC) is produced, which has, as an added feature, a number of transistor pairs with associated comparators (block 200). In a preferred embodiment, the number of comparators is greater than the number of bits required for the CID. In one embodiment, two hundred twenty-four comparators are implemented. Both inputs of each of the comparators is connected to an input voltage (Vin) (block 202). Since the comparator outputs are related to the threshold voltages of each transistor pair, the comparator outputs are effectively uniform random. In one embodiment, a table of indices (T) is created such that each index corresponds to an output value (Vout) of one comparator (block 204). The entire string of output values corresponds to the FID of the chip.

The chip is tested by monitoring the output value of each comparator at various extreme conditions (block 206). If the output values of a comparator change as the conditions change, the index of that output value in Table (T) is marked as unstable (block 208). By implication, the indices in Table (T) of those bits that maintained a consistent value throughout testing correspond to stable comparator bits, which may be relied on for the purpose of producing a reliable (stable) CID. As used herein, the terms "index" and "indices" refer to a persistent array that associates the indexed value(s) with the comparator that produced the value(s). The indices can then be used to select bits for use in generating a stable CID.

If there are more than 50 unstable bits identified during testing (block 210), then the chip or ASIC is declared unsuitable for having a CID-root key (block 212). If there are less than 50 unstable bits identified during testing (block 210), then the CID length (L) is specified (block 214). A hash value (S) is calculated from the first L-stable (FID) bits based on the Table of indices (T) (block 216). As used herein, a hash is a mathematical formula that converts a string of bits of arbitrary length into a unique value (the unique value is hash value "S" in this instance). A checksum is a type of hash, as is a function that converts arbitrary long numbers (bit strings) to fixed length numbers (sometimes referred to as a "digest or digital fingerprint"). If there is no easy way to find any information about the original message from the unique hash value, the hash function is called a "secure hash", a "cryptographically secure hash", or a "one-way hash" function. A checksum, for example, is also a hash, but not a cryptographically secure hash, because the checksum leaks information about the original message. In general, a cryptographically secure hash function is an algorithm that produces cryptographically secure hash passwords, which are irreversible or prohibitively expensive to reverse. One example of a cryptographically secure hash function is Secure Hash Algorithm-1 (SHA-1), a hash function developed by the United States National Security Agency (NSA) for use with National Institute of Standards and Technology's (NIST's) Digital Signature Standard (DSS). The SHA-1 function produces a 160-bit digest for use in Secure Socket Layer (SSL) transactions. Another example of a cryptographically secure hash function is Message Digest Algorithm #5 (MD5), which was invented by Ronald Rivest and placed in the public domain by RSA Data Security, Inc. The MD5 hash function such is a one-way operation that transforms a data string of any length into a shorter, fixed-length value. No two strings of data produce the same hash value. This algorithm is widely used for insuring message integrity and in processes for creating and verifying digital signatures. Typically, an MD5 checksum verifies the data integrity by running a hash operation on the data after it is received. The resultant hash value is compared to the hash value that was sent with the data. If the two values match, this indicates that the data has not been altered or tampered with, and its integrity may be trusted. Other cryptographically secure hash functions may also be used herein. In a preferred embodiment, the secure hash function is irreversible or prohibitively expensive to reverse. In a preferred embodiment, the hash value (S) is calculated from a secure hash function, which provides no information about the original bit string and which cannot be reverse engineered to produce the original bit string.

Finally, the table of indices (T) and the corresponding hash value (S) are stored in a memory (block 218). In one embodiment, the table (T) and the hash value (S) are stored in a non-volatile memory. In another embodiment, the table (T) and the hash value (S) are stored on the storage media of the storage device. In a preferred embodiment, the table (T) and hash value (S) are stored on a hidden partition within the storage media.

It should be understood that the table of indices is simply a device for maintaining a list of stable FID bit identifiers. Instead of a table of indices (T), the list of stable bits could be identified using any identifier that can be loaded on startup, provided the identifier does not store information that would allow the key to be recreated from the identifier directly. Additionally, in a preferred embodiment, the hash value (S) is a single numeric value calculated from the CID bits. Other techniques may also be used to calculate a reliability metric or value in order to verify if the assembled CID is correct. For example, in an alternative embodiment, the value could be checksum or any metric for evaluating the correctness of a CID. In a preferred embodiment, the verification value is a single numeric value calculated from the CID bits using a cryptographically secure function or a function that is very hard to invert.

The length of the CID may be specified, for example, by a customer to fit a specific security need. In one embodiment, the customer specifies the CID length to be used for cryptography, and the manufacturer configures the CID length L to meet the specification. In an alternative embodiment, the CID length may be predetermined by the manufacturer for a particular security level. In either instance, the hash value is generated from the first stable bits from bit zero through bit-(L-1). It should be understood by a worker skilled in the art that if the CID is used for information encryption, the length of the CID is related to the security level. In other words, the longer the encryption key, the harder the encrypted data is to recover without the key. However, there is a footprint and speed trade-off associated with longer CIDs. Specifically, production of a CID in this manner requires a number of comparators and associated transistors, which require physical space considerations on the chip itself. Moreover, the longer the CID is, the more processing is required to restore the CID if a bit changes value over time (which will be explained in greater detail with respect to FIG. 4).

Typically, if the CID is to be used as the root key for encryption/decryption purposes, anything less than 80 bits is susceptible to discovery by brute force. In a preferred embodiment, the length (L) of the CID is 128 bits. In another embodiment, length (L) of the CID is 192 bits. In yet another embodiment, the length (L) of the CID is a selected number of bits required to correctly implement an encryption algorithm, with which the root key is used to encrypt and decrypt data written to and read from the storage media. It will be understood by workers skilled in the art that fewer bits may be utilized in some embodiments, and the CID can be sign-extended or zero-padded to operate correctly with the encryption algorithm.

In one embodiment of the present invention, the encryption algorithm is a data encryption standard (DES) algorithm that utilizes a 40-bit or a 56-bit key to encrypt and to decrypt data. In another embodiment, the encryption algorithm is an advanced encryption standard (AES) algorithm, which utilizes a key having a length of 128 bits, 192 bits, or 256 bits. Other encryption algorithms may also be utilized to encrypt data using the root key.

In one embodiment, blocks 200 through 210 correspond to a process of identifying stable bits of a plurality of comparator outputs. Block 214 corresponds to a process of selecting a root key (chip ID) from a number (L) of the identified stable bits. Block 216 relates to calculating a statistically unique value from the root key using a cryptographically secure function. Block 218 corresponds to storing an identifier of the identified stable bits and the statistically unique value, where the identifier may be a table of indices (T) or some other identifier that can be utilized to select the appropriate stable bit values.

Figure 3:
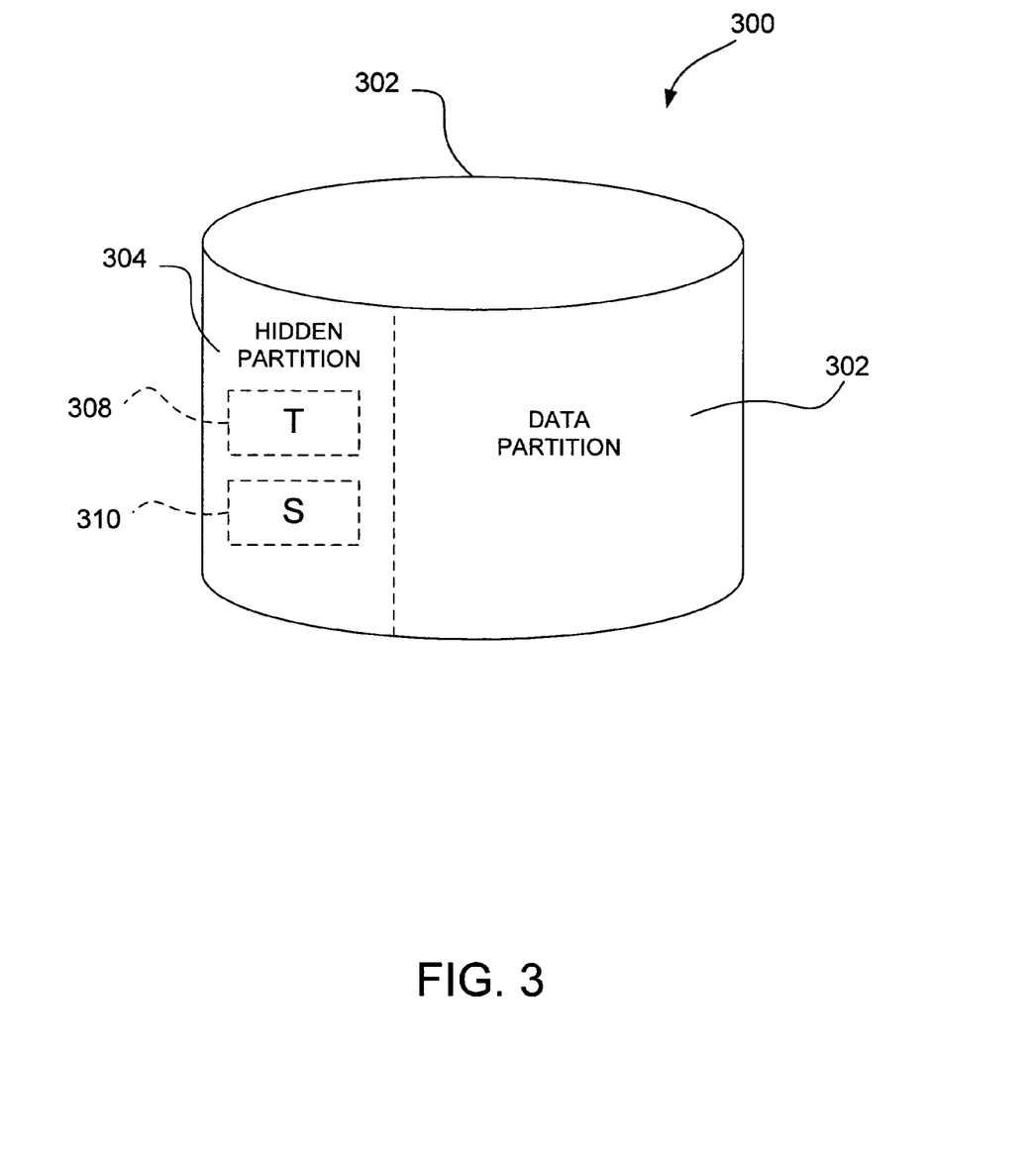
FIG. 3 is a simplified block diagram of a hidden partition on a storage subsystem according to an embodiment of the present invention.

FIG. 3 illustrates a simplified block diagram of a storage media 300 according to an embodiment of the present invention. As shown, the storage media 302 is partitioned into a hidden partition 304 and a data partition 306. Generally, the hidden partition is a portion of the storage media that is not exposed to the operating system of the host device. Typically, most discs include a hidden partition, which may include firmware for the controller. From the perspective of the operating system, the hidden partition does not exist.

The table of indices (T) (or stable bit identifier) that is calculated by the manufacturer during testing is stored in table 308 within the hidden partition. Alternatively, if the indices of stable ID bits are not stored in a table, then the stable bit identifier is stored in the hidden partition. A CID is constructed from the FID according to the first predetermined number of stable indices in table T. Generally, the number of indices used to construct the CID may be determined according to the security level required. In a preferred embodiment, the CID is constructed from the first 128 or more stable bits according to the table of indices (T) 308. A cryptographic hash (S) or other statistically unique verifying number is calculated from the newly constructed CID and stored alongside the table (T) on the disc. As shown, cryptographic hash (S) 310 is stored in hidden partition 304 alongside table (T) 308 in the storage media 302.

Figure 4:
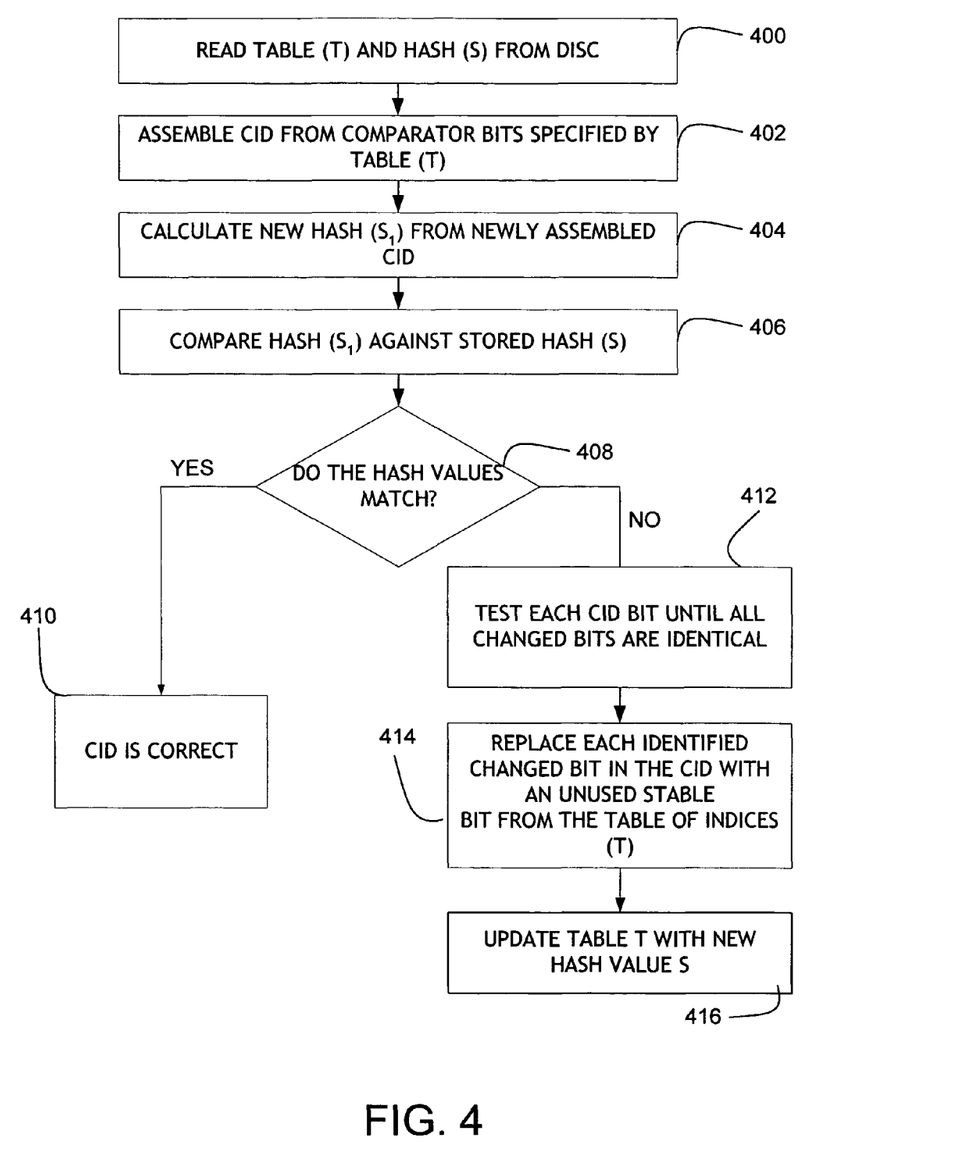
FIG. 4 is a simplified flow diagram of a process of verifying the chip ID on start up.

FIG. 4 illustrates a simplified flow diagram of a process for identifying an unstable bit during operation. As previously indicated, it is desirable to have a stable CID, which can then be used as a root key for encryption or for unlocking a public/private key pair. If some of the comparator bits become unstable among the bits initially determined to be stable, it is possible to reconstruct the original CID without error correction codes and without providing usable information to a hacker or an attacker. However, to reconstruct the original CID, the unstable bit(s) need to be identified.

Each time the ASIC or chip starts up, the table of indices (T) and hash value (S) are retrieved from memory (block 400). As previously discussed, the input voltage (Vin) delivered to both inputs of each of the comparators within the chip produce random output voltages (Vout) that together represent a physical silicon ID number (FID). On start up, this FID number is read and the CID is assembled from the FID using the comparator bits specified by the table of indices (T) (block 402).

A new cryptographic hash ($S_1$) is calculated from the newly assembled CID (block 404). The new cryptographic hash ($S_1$) is compared against the retrieved cryptographic hash (S) (block 406). If the cryptographic hash ($S_1$) matches the stored cryptographic hash (S) (block 408), the CID is correct (block 410), meaning that the CID can be utilized as the root key or to unlock the keys, depending on the implementation.

If the hash values do not match (block 408), then at least one of comparator bits (FID bits) has changed. Each CID bit is tested until all changed bits are identified (block 412). Each changed CID bit is replaced by an unused stable bit according to the table of indices (T) (block 414), and the table of indices (T) is updated with the new stable bits (block 416).

It should be understood by a worker skilled in the art that the techniques described herein may be implemented in hardware or software. For example, in one embodiment, blocks 400 through 404 may be implemented in software or as a comparator circuit block element. Blocks 406 and 408 could be implemented in software or as a hash comparator element. Block 412 through block 416 could be implemented in software or as a root key restoration circuit element. If the resulting chip ID is used as a root key to encrypt information written to or read from the storage media, the controller may include a cryptographic circuit block or element to encrypt the data using the chip ID as a root key.

Figure 5:
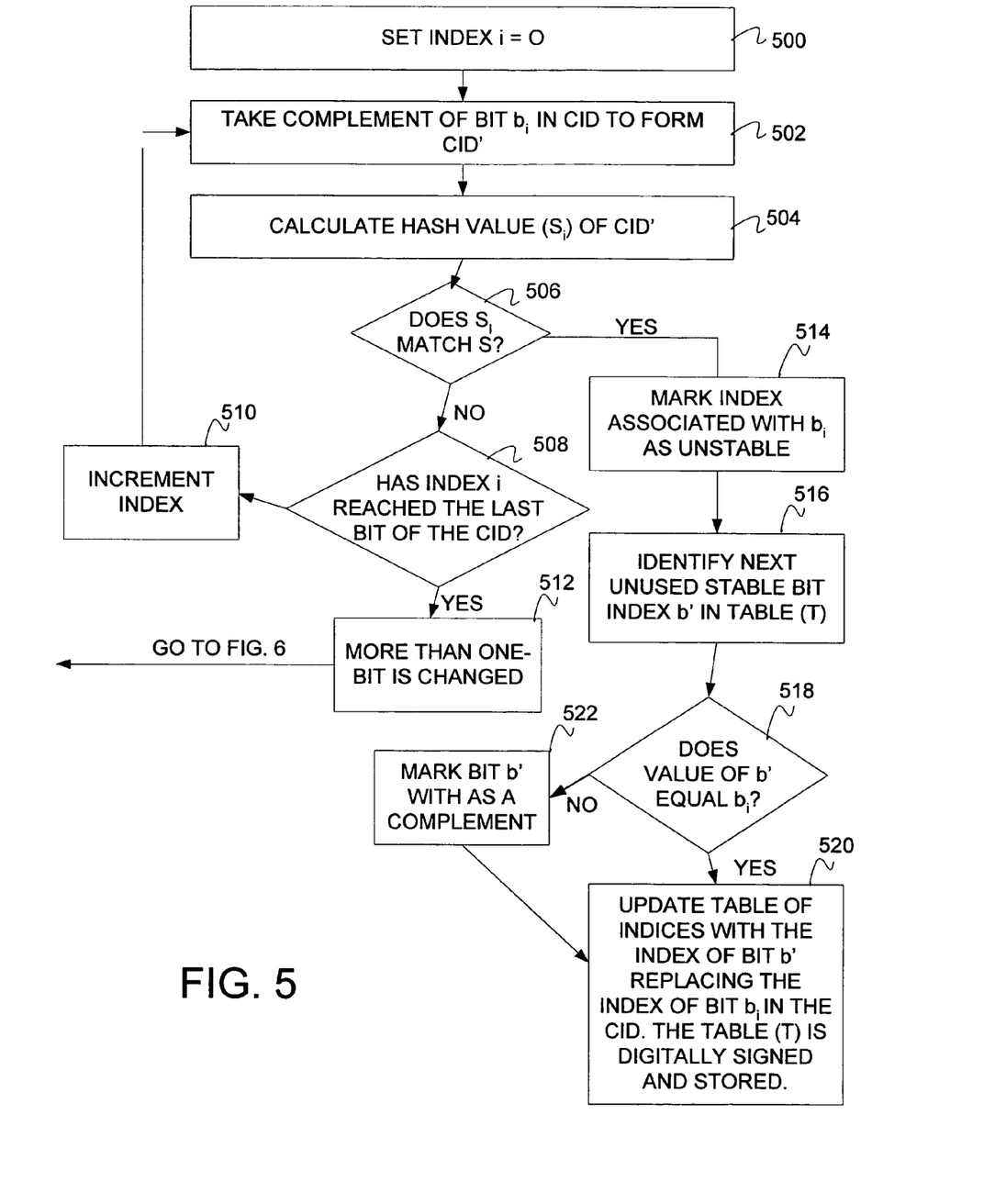
FIG. 5 is a simplified flow diagram of a method of recovering the chip ID if initial hash comparisons do not match because one chip ID bit has changed according to an embodiment of the present invention.

FIG. 5 illustrates a simplified flow diagram of a method of recovering the chip ID if one chip ID bit has flipped or changed over time. This flow diagram is simplified for clarity purposes, and it is assumed that hash comparison (block 408 in FIG. 4) has already occurred. Thus, FIG. 5 represents a more detailed flow diagram corresponding to blocks 412 through 416 in FIG. 4. It should be understood that based on the hash comparison alone, it is impossible to know how many bits have changed, so the process of restoring the chip ID involves first identifying the bits that have changed, then updating the table of indices to reflect that those changed bits are unstable and replacing the changed chip ID bit indices with other stable indices within the table of indices (T).

For the purpose of this discussion, the chip ID has a length (L), meaning that the chip ID is comprised of L-stable bits, and the pseudo-code used herein to explain the iterative process is for example purposes only, and is included herein to simplify the explanation.

Once the hash values (S and $S_1$) have been compared and found not to match, the process of restoring the original chip ID is started. Since the process requires identifying the changed bit(s), it is necessary to cycle through the chip ID, flipping one bit at a time and calculating the hash value of the changed chip ID until that hash value matches the stored hash value (S). Thus, an index value (i) is set equal to zero (e.g. i=0)

(block 500). The complement of bit $b_1$ in the CID is taken to form a new chip ID (CID') (block 502). The hash value ($S_1$) of CID' is calculated (block 504). The hash value ($S_1$) is compared against the stored hash value (S) (block 506). If the hash values ($S_1$ and S) do not match, the index value is checked to make sure that the index value hasn't reached the last bit of the CID (block 508). If the index is not yet equal to the last bit, then the index value (i) is incremented (block 510), and a new CID' value is calculated by taking the complement of bit $b_1$ in CID (block 502). The increment and flip process is repeated until each possible variant of the CID is tested.

Figure 6:
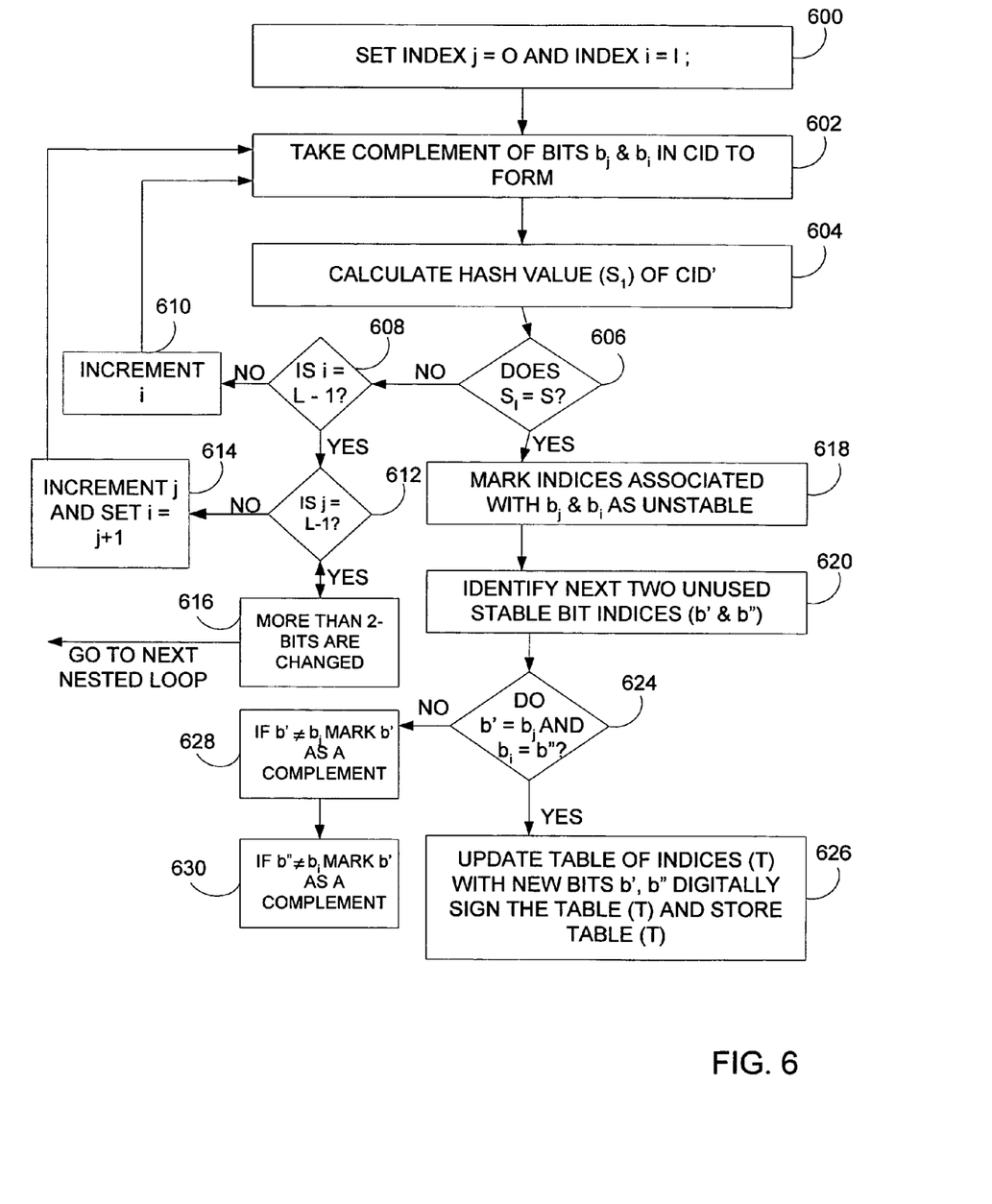
FIG. 6 is a simplified flow diagram of a method of recovering the chip ID if initial hash comparisons do not match because two chip ID bits have changed according to an embodiment of the present invention.

If the hash values do not match (at block 506) and the index value has reached the end of the CID (at block 508), then more than one-bit has been changed within the CID (block 512), and a two-bit test sequence is performed, such as that shown in FIG. 6.

If the hash value $S_1$ and the stored hash value S match, then the index associated with bit $b_i$ is marked as unstable (block 514). The next unused and stable bit (b') in the table of indices (T) is identified. Here, the n is an integer value in a range of zero to the number of comparators minus one. It should be understood that the CID is formed from the first L-stable bits. Within the table of indices (T), any number of unstable bits may be possible and are randomly distributed throughout the table of indices (T). Thus, for example, is L is equal to 128-bits, the first L-stable bits may have included $b_0$-$b_{12}$, $b_{14}$-$b_{34}$, and $b_{36}$-$b_{129}$, where $b_{13}$ and $b_{35}$ were initially determined to be unstable. The next stable and unused bit in the table of indices (T) might be $b_{130}$; however, if $b_{130}$ is unstable, then $b_{131}$ is chosen, and so on.

Once the next stable and unused bit is identified, the value of that bit (b') is compared to the value of bit $b_i$ (block 518). If the values match (for example, if both the value at $b_i$ and the value at b' are equal to '1'), then the table of indices (T) is updated with b' replacing $b_i$ in the CID (block 520). If the values do not match (for example, if the value at $b_i$ is equal to '0' and the value at b' is equal to '1'), then b' is marked as a complement (for example, marked with a '–' sign) to indicate that the value at b' is a logical complement of the value at $b_i$. (block 522). The table of indices (T) is then updated with the index of b' replacing the index of $b_i$ in the CID. The table is digitally signed and stored (block 520).

FIG. 6 illustrates a simplified flow diagram of a method of restoring a CID if two bits in the CID have changed. Here, since two bits are changed, two index values are needed to process the CID and identify the changed bits. In this example, the pseudo code suggests that the two values are j and i, where j is initialized to zero and i is initialized to one. (block 600). It will be understood by a worker skilled in the art that the processes of FIGS. 5 and 6 are not necessarily separate. They can be nested loops, such that if the one-bit iteration results in a matching hash $S_1$, then the outer loops need not be processed and so on.

Once the index values are set (block 600), the bit complement of bits $b_j$ and $b_i$ are taken in the CID to form a CID' (block 602). The hash value ($S_1$) of the CID' is calculated (block 604). The calculated hash value ($S_1$) is compared to the stored hash value (S) (block 606). If the values ($S_1$ and S) do not match, then the index value i is compared to the number of bits in the CID (block 608). If the index value i has not yet reached the last bit in the CID, the index value i is incremented (block 610) and the process returns to block 602 to process the next iteration.

If the index value i has reached the last bit of the CID, then the index value j is compared to the number of bits in the CID minus 1 (block 612). If the index value j has not reached the second to last bit in the CID, then index value j is incremented, index value i is reset to equal j+1 (block 614), and the process returns to block 602 to process the next iteration. If index value j has reached the second to last bit in the CID, then more than 2-bits have been changed (block 616), and the next outer loop (k, and so on) would be incremented.

If hash value $S_1$ matches the stored hash value S (block 606), the indices associated with bits $b_i$ and $b_j$ are marked as unstable (block 618). The next two unused and stable bits (b' and b") are identified in the table of indices (T) (block 620). The value of bit b' is compared to $b_i$ and the value of bit b" is compared to $b_j$. (block 624). If they are both equal, then the table of indices (T) is updated with the indices of the unused and stable bits b' and b", table (T) is digitally signed and is stored (block 626).

If bit $b_i \neq$ b', bit b' is marked as a complement (block 628). If bit $b_j \neq$ b", bit b" is marked as a complement (block 630). The table of indices (T) is updated with the indices of the new bits, digitally signed and stored (block 626).

In general, each bit in the CID is flipped, one at a time, two at a time and so on, until the newly calculated hash ($S_1$) matches the stored encryptographic hash (S). This process can be conceptualized as a brute force recovery technique, which can work for any number of changed bits. Thus, it is possible to tolerate multiple bits becoming unreliable during the lifetime of the storage device, as long as there remains sufficient replacements.

It should be understood that the unused and stable bit actually replaces the CID bit found to be unstable. For example, if the original CID is formed from the first 128 bits out of a possible 224 comparator values, and if bit 2 is found to have changed, bit 2 out of the first 128 bits is marked as unstable in the table of indices (T), and a stable and unused bit from the table of indices corresponding to bits 129 through 224 of the 224 comparator values is selected to replace the unstable bit 2 in the CID. The subsequent CID will be constructed using the first 0, 1, and 3-129 stable bits, where bit $b_{129}$ replaces bit $b_2$ in sequence ($b_0$, $b_1$, $b_{129}$, and $b_{3-128}$). More particularly, if the value of bit $b_{129}$ is different from the original value of bit $b_2$, the compliment of bit $b_{129}$ is utilized ($b_0$, $b_1$, $-b_{129}$, and $b_{3-128}$). In this manner, it is possible to tolerate multiple bits becoming unreliable during the lifetime of the drive, as long as there are sufficient replacement bits.

If more than a few bits flip at a time, the CID search and replacement becomes slower, but remains possible. Assuming a 200 megabit per second hashing speed of a cheap SHA-1 engine (with 512 bit blocks), 400,000 bit flips can be tested per second. The number of possible 1, 2, and 3-bit flips are 128, 16,384, and 2,097,152 respectively. All possible three-bit variations can be tested within five seconds (worst case), and two bit variations can be corrected in an average of 20 milliseconds. If more than three bits at one time are changed, the time-overhead required to recover the bits increases dramatically. In general, the bit-change scenario is resolved using the "L-choose-n" statistical equation, where L is the length of the CID, and n is the number of changed bits. L-choose-2 is essentially a quadratic equation. L-choose-3 is essentially a cubic equation, and so on. L-choose-4 becomes very slow, and in most instances may be undesirable.

While at high processing speeds it is possible to iteratively compare more than three bits that have become unreliable, such circumstances may indicate other problems, which may make it undesirable to attempt to recover the data anyway. In a preferred embodiment, up to three changed bits in the CID can be recovered at start up. In alternative embodiments, three or more bits may be affected and still the CID may be recovered.

In general, the present invention applies to any storage media, and can be used on any storage device capable of producing a physical CID number from any random source. As previously discussed, since the CID value can be dynamically constructed, and compared against a stored hash (S), it can be statistically determined that the CID value is correct. Since the CID can be verified and/or recovered from a hash value and physical comparator outputs, there is no stored data or error correction code on the disc from which the CID can be recovered. Thus, the CID is a good candidate for use as a key or root key. The CID can be used either to recover an encrypted key or key pair or as a root key to encrypt and decrypt data from the storage media.

This technique for producing and maintaining a stable CID from an unstable and statistically uniform random physical source has a number of advantages over prior art techniques. First, since the CID is not stored, it is not susceptible to unauthorized discovery. Second, since the CID is not programmed, the CID is not known in plaintext outside of the storage subsystem. Third, since the hash value is simply a numeric value calculated from a mathematical formula that converts the string into a number, the hash value cannot be reverse engineered or otherwise utilized to retrieve the original CID. Additionally, the table (T) stores only a table of indices and not the actual CID value, so no stored value on the disc provides access to the CID. Thus, the present invention provides a secure and stable string that is generated reliably and dynamically on start up, and which can be utilized as a root key. Since stored values on the disc provide no information about the key, the root key remains undiscoverable from information on the disc.

Finally, it should be understood that the techniques of the present invention may be implemented in hardware or software. Typically, the various steps as described herein are performed by a controller, which may include hardware and software elements. In one embodiment, the hash algorithm and comparison algorithms are implemented in hardware using a hash element and a comparator element for performing the bit-wise restoration of the disc controller ID. In one embodiment, the bit-wise restoration process occurs in parallel such that each possible comparator output sequence is tested substantially simultaneously in order to detect changed bits and to restore the controller ID. In general, all of the method steps may be software functions or hardware circuit elements with equivalent functionality.

It should also be understood that the chip ID can be used as a root key. Since the ID itself is not stored on the storage media, a storage device implemented using the present invention provides hardened security against attach. Specifically, the controller and the disc media must operate together. For example, one technique for hacking a disc storage system involves producing a hacked disc controller with which all information on the storage media (disc platters) can be logged. By attaching such a hacked disc controller to the disc platters through a channel signal processor, all the secrets on the disc could be read. With the present invention, however, such an attach fails because the root key is stored only in the original controller chip and all other user keys and critical security information is encrypted with this key, which remains unknown to the attacker. Similarly, in the past, the disc platters could be removed and examined using specialized equipment, such as a magnetic force microscope. With the present invention, the information remains encrypted so only encrypted information can be retrieved. Thus, no secrets are leaked even with such hacking techniques.

In general, the present invention is not directed to locking down the drive. In other words, if an unauthorized user were to gain access to the host machine, the drive would generally be accessible. Locking down the drive to prevent unauthorized access is typically performed using other means, such as whole disc encryption and partition encryption. For these purposes, it is conceivable that the root key could also be used or a portion of the root key could be combined with a user passcode to form a disc encryption key in order to lock down the drive.

While it is understood that the root key may still be discovered by dissembling the storage media and packaged integrated circuit and by measuring the FID values to produce the CID from the table of indices, such a technique for discovering the root key would be extremely costly and readily detectable by the owner of the storage subsystem.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the storage subsystem while maintaining substantially the same functionality without departing from the scope and spirit of the present invention. In addition, although the preferred embodiment described herein is directed to a cryptographic system for producing a stable disc controller ID from unstable CID bits, it will be appreciated by those skilled in the art that the teachings of the present invention can be applied to any storage device, storage media or subsystem, without departing from the scope and spirit of the present invention.

What is claimed is:

1. A device comprising:
  a controller adapted to:
    determine a physical identification (ID) based on a physical property of a computer chip, the physical ID comprising multiple bits of data;
    select a particular subset of bits from the physical ID based on the stability of the bits, the particular subset comprising less than all of the multiple bits of data of the physical ID and comprising only bits identified as being stable; and
    generate a cryptographic key from the particular subset of bits from the physical ID.

2. The device of claim 1 further comprising the controller adapted to encrypt data based on the cryptographic key.

3. The device of claim 1 further comprising the controller adapted to select the particular subset based on an identifier of stable bits of the physical ID.

4. The device of claim 3 further comprising the controller adapted to identify the stable bits based on a table that indicates whether each bit of the physical ID is stable.

5. The device of claim 1 further comprising the controller adapted to identify unstable bits of the physical ID by testing each bit of the physical ID to identify any bit that is changed from a previous test.

6. The device of claim 5 further comprising the controller adapted to detect a changed bit in the particular subset of bits, determine that the changed bit is unstable, replace the changed bit with a stable bit that was not used to generate the cryptographic key, and generate a second cryptographic key based on the subset of bits having the stable bit.

7. The device of claim 1 wherein the physical property comprises outputs of multiple comparators, each output producing one of the multiple bits, and further comprising the controller adapted to test each output by comparing a selected output to a previous test result.

8. The device of claim 7 further comprising the controller adapted to mark a bit as unstable when an output that produces the bit has changed, store a table to identify the stable bits, and select the particular subset based on the table such that the particular subset comprises only stable bits.

9. The device of claim 1 further comprising the controller adapted to determine a number of the physical ID bits that are unstable and determine that the computer chip is unsuitable for generating the cryptographic key when the number of physical ID bits that are unstable is greater than a threshold.

10. A device comprising:
a controller adapted to:
select a first subset of bits from a physical identification (ID), wherein each bit in the physical ID has a value that is random due to physical variations in structures in the device, the first subset comprising less than all bits of data of the physical ID;
generate a cryptographic key from the particular subset of bits from the physical ID;
determine that a value of at least one bit of the first subset of bits changed after generating the cryptographic key;
replace the changed bit with a different bit from the physical ID to form a second subset of bits from the physical ID; and
generate the same cryptographic key from the second subset of bits as the cryptographic key that was generated from the first subset of bits.

11. The device of claim 10 wherein the structures comprise multiple comparators, each of the comparators having an output that generates one of multiple bits of data in the physical ID.

12. The device of claim 11 wherein both inputs of each comparator are electrically coupled to a supply voltage.

13. The device of claim 12 further comprising the controller adapted to identify stable bits in the physical ID based on a table that indicates whether each bit of the physical ID is stable.

14. The device of claim 13 wherein the table is generated by:
applying the supply voltage to each of the inputs of the comparators;
measuring an output of each comparator multiple times;
determining when a specific output has changed;
storing an indicator in the table that the specific output is unstable when the specific output has changed.

15. The device of claim 14 wherein the step of measuring comprises:
varying environmental conditions; and
taking measurements of the output of each comparator at the various environmental conditions.

16. The device of claim 10 further comprising a memory coupled to the controller, wherein the list of stable bits and a single numeric value calculated from the values of the second subset of bits are stored in the memory.

17. The device of claim 16 wherein a portion of the memory comprises a hidden partition not accessible external to the device and the list of stable bits and the single numeric value are stored in the hidden partition.

18. A method comprising:
determining, via a controller, a physical identification (ID) based on a physical property of a computer chip, the physical ID comprising multiple bits of data;
storing a list to identify any unstable bits in the physical ID;
selecting a particular subset of bits from the physical ID such that the particular subset does not contain bits identified as unstable in the list, the particular subset comprising less than all of the multiple bits of data of the physical ID;
generating a cryptographic key from the particular subset of bits from the physical ID.

19. The method of claim 18 further comprising encrypting data using the cryptographic key and storing the data in a data storage medium.

20. The method of claim 18 further comprising
determining a bit is unstable when an output that produces the bit has changed.

21. The method of claim 20 further comprising:
detecting a changed bit in the particular subset of bits;
removing the changed bit from the subset of bits;
selecting a new subset of bits that does not include the changed bit; and
generating the same cryptographic key based on the new subset of bits as the cryptographic key generated from the subset of bits.

22. The method of claim 18 wherein the computer chip comprises multiple comparators, each of the comparators having an output that generates one of the bits of data in the physical ID.

23. The method of claim 18 wherein the list is generated by:
applying a supply voltage to each input of the comparators;
determining when a specific output of a comparator has changed; and
storing an indicator in the list that the specific output is unstable when the specific output has changed.

24. The device of claim 10 wherein the controller is further adapted to generate the same cryptographic key from the second subset of bits by using the compliment of a value of the different bit used to form the second subset of bits.

* * * * *